United States Patent
Kuo et al.

(10) Patent No.: US 8,295,374 B2
(45) Date of Patent: Oct. 23, 2012

(54) SIGNAL DETECTING METHOD AND RECEIVER USING THE SAME

(75) Inventors: Chih-Cheng Kuo, Hsinchu (TW);
Chang-Lung Hsiao, Taipei (TW);
Wern-Ho Sheen, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 993 days.

(21) Appl. No.: 12/326,161

(22) Filed: Dec. 2, 2008

(65) Prior Publication Data

US 2010/0002786 A1    Jan. 7, 2010

(30) Foreign Application Priority Data

Jul. 7, 2008    (TW) .................................. 97125556 A

(51) Int. Cl.
*H04K 1/10* (2006.01)
(52) U.S. Cl. ........ 375/260; 375/259; 375/267; 375/144; 370/338; 370/349; 370/329; 455/454
(58) Field of Classification Search .................. 375/260, 375/259, 267, 346, 144; 370/338, 349, 329; 455/454
See application file for complete search history.

(56) References Cited

U.S. PATENT DOCUMENTS

| | | | |
|---|---|---|---|
| 6,724,843 B1 | 4/2004 | Clarkson et al. | |
| 2005/0002468 A1* | 1/2005 | Walton et al. | 375/267 |
| 2006/0285531 A1* | 12/2006 | Howard et al. | 370/343 |
| 2007/0268981 A1 | 11/2007 | Heiskala | |
| 2008/0075183 A1* | 3/2008 | Ponnampalam et al. | 375/260 |

OTHER PUBLICATIONS

"Algorithm and Implementation of the K-Best Sphere Decoding for MIMO Detection" Zhan Guo et al., IEEE Journal on Selected Areas in Communications, vol. 24, No. 3, Mar. 2006.
"Near-Maximum-Likelihood Detection of MIMO Systems Using MMSE-Based Lattice-Reduction" Dirk Wubben et al., IEEE Communications Society, 2004.
"MMSE Channel Factorization for Near Maximum-Likelihood Detection of MIMO Signals" Chih-Cheng Kuo et al., National Chiao Tung University.
"Factoring Polynomials with Rational Coefficients" A.K. Lenstra et al., Mathematische Annalen 261, 515-534 (1982).

* cited by examiner

*Primary Examiner* — Zewdu Kassa
(74) *Attorney, Agent, or Firm* — Thomas|Kayden

(57) ABSTRACT

A signal detecting method and a receiver using the same are provided. The method includes the following steps. A receiving signal vector y is received through a number of channels, wherein the receiving signal vector y corresponds to a transmitting signal vector x transmitted by at least one of the channels. A channel matrix H is determined, wherein the channel matrix H represents at least one of the channels. A factorization matrix D is chosen, wherein D is invertible to make the channel matrix H expressed as $H=\tilde{H}D$, and $\tilde{H}$ is a corresponding channel matrix. The factorization matrix D is determined to make an expected value of the signal estimate error become smaller. The receiving signal vector y is detected to estimate the transmitting signal vector x according to the corresponding channel matrix $\tilde{H}$ and the factorization matrix D.

34 Claims, 9 Drawing Sheets

SIGNAL DETECTING METHOD AND RECEIVER USING THE SAME

This application claims the benefit of Taiwan application Serial No. 97125556, filed Jul. 7, 2008, the subject matter of which is incorporated herein by reference.

FIELD OF THE INVENTION

The invention relates in general to a signal detecting method and a receiver using the same.

BACKGROUND

In the field of communication, many communication systems including multiple input multiple output (MIMO) system and orthogonal frequency division multiplexing-code division multiple access (OFDM-CDMA) system are subject to the problem of signal detection. That is, the transmitting signal vector x is detected according to the receiving signal vector y=Hx+n.

Wherein, the channel matrix H and the statistic characteristics (such as Gaussian white noise) of the noise vector n are given, and the elements of the transmitting signal vector x are symbols obtained by way of quadrature amplitude modulation (QAM). In theory, the detecting method which produces minimum error rate is maximum likelihood detection (ML detection), but the complexity increases exponentially along with the dimension of the transmitting signal vector x and the magnitude of modulation, and becomes impractical to actual signal telecommunication system.

To the contrary, despite some detecting methods such as zero forcing method and Lenstra-Lenstra-Lovász (LLL) method have low complexity but the detecting performance is too poor to be accepted in actual systems.

Let the LLL method which is developed from the field of mathematics be taken for example. The contents and object of the LLL method are disclosed below.

Let the channel matrix be expressed as $H=[h_1, \ldots, h_{n_t}]$, wherein $n_t$ is the number of column vectors, $\{h_1, \ldots, h_{n_t}\}$ is a set of basis of the lattice. The object of the detecting method is to search for another set of basis $\{\tilde{h}_1, \ldots, \tilde{h}_{n_t}\}$ to expand the lattice. It is preferred that the vectors of this new set of basis are shorter and more orthogonal. The spirit and operation of the detecting method lie in the use of Gram-Schmidt orthogonalization process (GSO). The pseudo code of the detecting method is disclosed below:

```
i=2
while (i ≤ n_t)
    h_i = h_i - ⌈μ_{i,i-1}⌋h_{i-1}, update GSO
    if (||q_i + μ_{i,i-1}q_{i-1}||² < δ||q_{i-1}||²)
        swap h_{i-1} and h_i, update GSO
        i=i-1
    else
        for j=i-2 to 1
            h_i = h_i - ⌈μ_{ij}⌋h_j, update GSO
        end
        i=i+1
    end
end                                    , wherein
```

$$GSO: [h_1, h_2, \ldots, h_{n_1}] = [q_1, q_2, \ldots, q_{n_1}] \begin{bmatrix} 1 & & & & 0 \\ \mu_{2,1} & 1 & & & \\ \mu_{3,1} & \mu_{3,2} & 1 & & \\ \vdots & \vdots & \vdots & \ddots & \\ \mu_{n_1,1} & \mu_{n_1,2} & \mu_{n_1,3} & \cdots & 1 \end{bmatrix}^T$$

However, the detecting method still has many technical difficulties:

1. The complexity of the detecting method is related to the basis $\{h_1, \ldots, h_{n_t}\}$ inputted at the beginning and is nondeterministic. This problem is difficult to handle in terms of hardware operation, and the unpredictable complexity in signal processing makes the design of hardware more difficult.

2. The detecting method aims at outputting another set of basis $\{\tilde{h}_1, \ldots, \tilde{h}_{n_t}\}$ which is more orthogonal and can expand the same lattice. Based on the process and result of the detecting method, the properties of the finally outputted result cannot be guaranteed because no parameter is used as a performance index for measuring the orthogonalization of the vector.

Thus, how to develop a signal detecting method which is efficient and can be realized and can improve the performance of error rate in detecting signals when applied to a signal telecommunication system has become an imminent issue to be resolved.

SUMMARY OF THE INVENTION

The invention is directed to a signal detecting method and a receiver using the same.

An exemplary embodiment in accordance with the invention, a method includes the following steps. A receiving signal vector y is received through a number of channels, wherein the receiving signal vector y corresponds to a transmitting signal vector x transmitted by at least one of the channels. A channel matrix H is determined, wherein the channel matrix H represents at least one of the channels. A factorization matrix D is chosen, wherein D is invertible to make the channel matrix factorized as H=H̃D, and H̃ is a corresponding channel matrix. The factorization matrix D is determined to make an expected value of the signal estimate error become smaller. The receiving signal vector y is detected to estimate the transmitting signal vector x according to the corresponding channel matrix H̃ and the factorization matrix D.

In another exemplary embodiment accordance with the invention, a receiver including a receiving unit, a channel estimating unit, a processing unit, and a signal estimating unit is provided. The receiving unit is used for receiving a receiving signal vector y through a number of channels, wherein the receiving signal vector y corresponds to a transmitting signal vector x transmitted by at least one of the channels. The channel estimating unit is used for determining a channel matrix H, wherein the channel matrix H represents at least one of the channels. The processing unit is used for choosing a factorization matrix D, wherein D is invertible to make the channel matrix H expressed as H=H̃D, wherein H̃ is a corresponding channel matrix. The factorization matrix D is determined to make an expected value of the signal estimate error become smaller. The signal estimating unit is used for detecting the receiving signal vector y to estimate the transmitting signal vector x according to the corresponding channel matrix H̃ and the factorization matrix D.

The invention will become apparent from the following detailed description of the preferred but non-limiting embodiments. The following description is made with reference to the accompanying drawings.

DETAILED DESCRIPTION OF THE INVENTION

Figure 1:
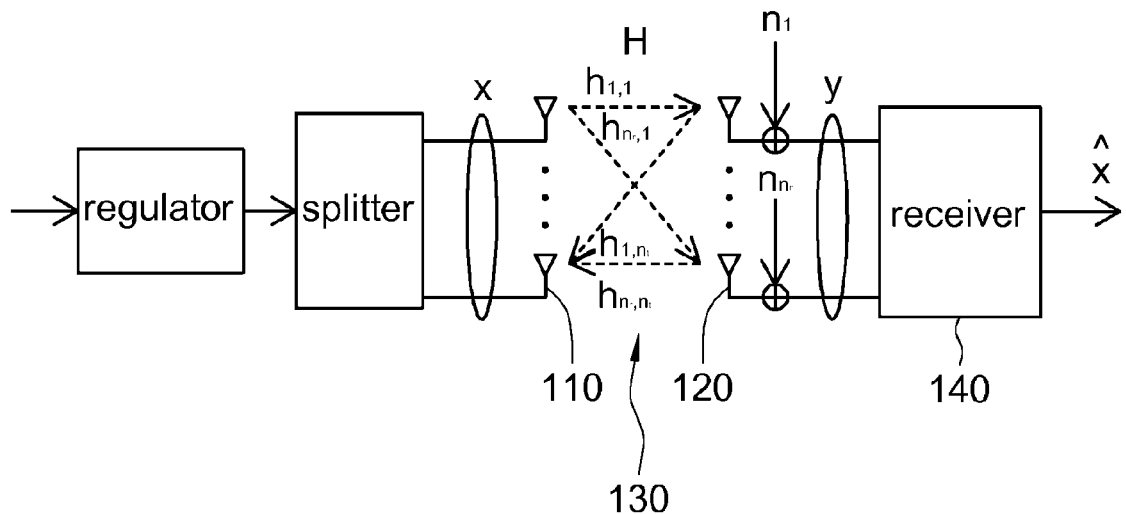
FIG. 1 shows an exemplary embodiment using a signal telecommunication system of a receiver of the invention.

Referring to FIG. 1, an exemplary embodiment using a signal telecommunication system 100 of a receiver 140 of the invention is shown. The signal telecommunication system 100 includes a number of channels 130, a number of output antennas 110, a number of input antennas 120 and a receiver 140. Examples of the channel 130 include multiple input multiple output (MIMO) channel and orthogonal frequency division multiplexing-code division multiple access (OFDM-CDMA) channel. In the present embodiment of the invention, the channel 130 is exemplified by an MIMO channel. The output antenna 110 outputs a transmitting signal vector x. The input antenna 120 receives a receiving signal vector y through a number of channels 130. The receiving signal vector y corresponds to the transmitting signal vector x transmitted by at least one of the channels 130. The relationship between the receiving signal vector y and the transmitting signal vector x is expressed as y=Hx+n, wherein H is a channel matrix, and n is a noise vector. The channel matrix H represents at least one of the channels 130. Let the channel 130 be a frequency flat Rayleigh fading channel, the elements of the noise vector n be complex Gaussian random variables which are identical independently distributed (I.I.D.), the average value of the elements of the noise vector n be 0, and the elements of the transmitting signal vector x be QAM symbols.

Generally speaking, maximum likelihood detecting method is a preferred method for detecting the receiving signal vector x. That is, $$\hat{x} = \arg \min_{x \in \Omega^{n_t}} \|y - Hx\|^2, \text{ wherein} \quad (1)$$

$$\Omega = \left\{ \pm \frac{1}{2} \pm j\frac{1}{2}, \ldots, \pm \frac{\sqrt{M}-1}{2} \pm j\frac{\sqrt{M}-1}{2} \right\}$$

That is, the estimate $\hat{x}$ obtained by estimating the transmitting signal vector x according to the detection of the receiving signal vector y is a QAM symbol of the set $\Omega$ which minimizes the square of the distance y−Hx.

Wherein $j=\sqrt{-1}$, $|\Omega|=M$ (the set $\Omega$ has M symbols, and M is a positive integer), and equation (1) is exemplified by M-ary QAM. According to equation (1), the complexity of the maximum likelihood detecting method increases exponentially as x or $\Omega$ increases.

Figure 2:
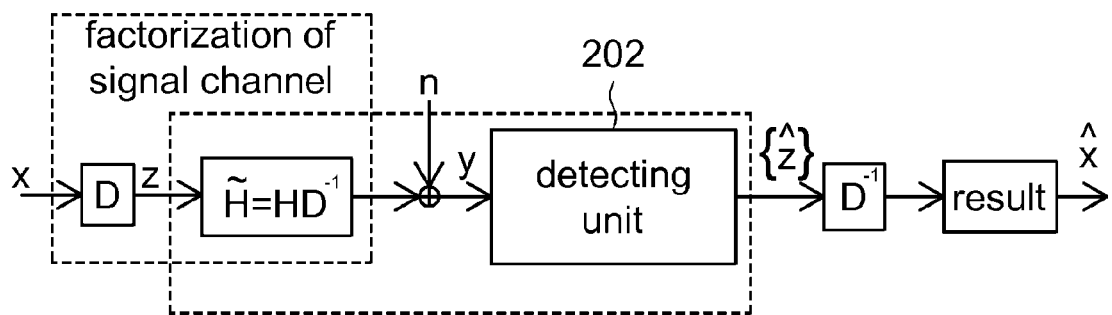
FIG. 2 shows a diagram of signal detection using channel factorization.

Referring to FIG. 2, a diagram of signal detection using channel factorization is shown. To reduce the complexity of the abovementioned maximum likelihood detecting method, a signal detecting method based on channel factorization is provided. Firstly, the channel matrix H is factorized as H=$\tilde{H}$D, wherein $\tilde{H}$ is a corresponding channel matrix, and D is a factorization matrix. Then, the receiver detects the signal z=Dx (executed by the detecting unit 202 of FIG. 2) to generate the detection result $\{\hat{z}\}$, wherein z is a intermediate signal vector. That is, the method regards $\tilde{H}$ as an equivalent channel, then the detection result $\{\hat{z}\}$ is transformed by $D^{-1}$ and the estimate $\hat{x}$ of the transmitting signal vector x is obtained through another trial of detection.

As indicated in FIG. 2, different results of channel factorization (H=$\tilde{H}$D) affect the performance of the error rate of signal detection. Thus, an efficient and implementable signal detecting method is provided so as to improve the error rate of signal detection in the abovementioned signal telecommunication system 100.

Figure 10:
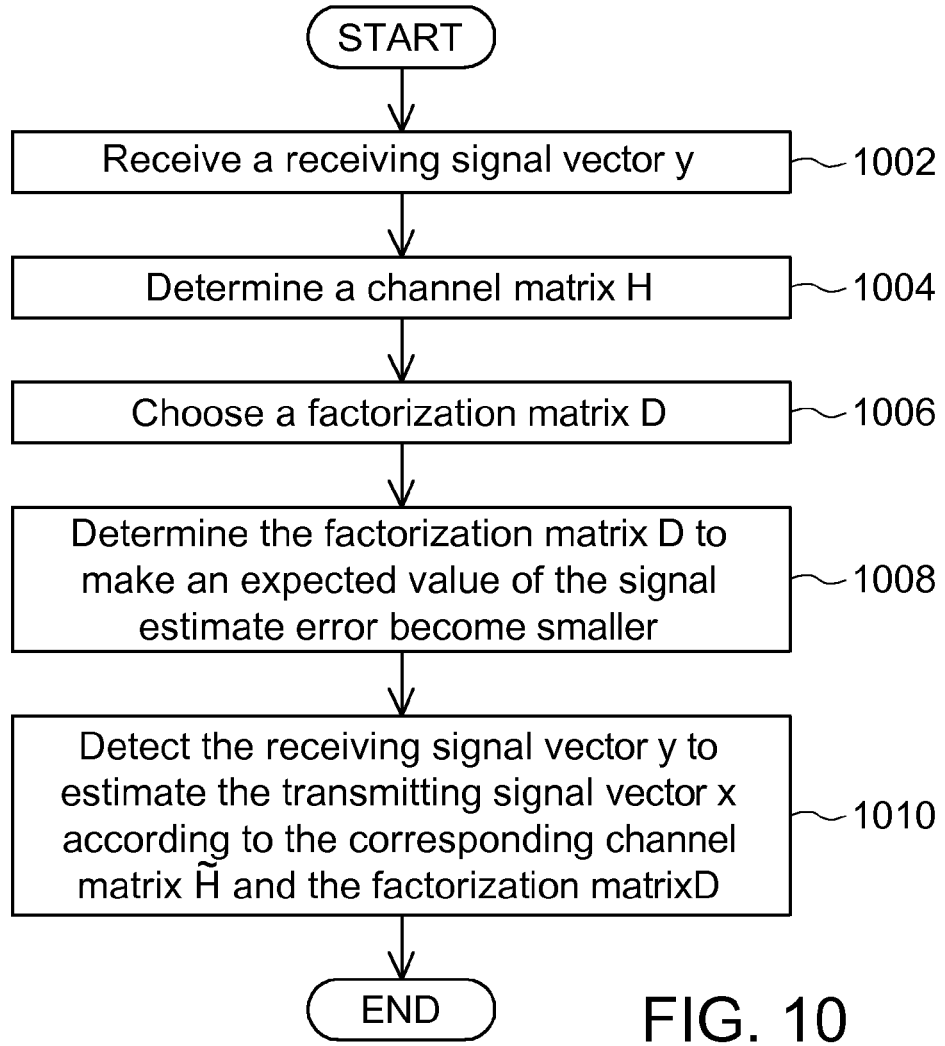
FIG. 10 shows an exemplary flowchart of a signal detecting method according to the technology of the invention embodiment.

Referring to FIG. 10, an exemplary flowchart of a signal detecting method according to the technology of the invention embodiment is shown. The method includes the following steps. In step 1002, a receiving signal vector y is received through a number of channels, wherein the receiving signal vector y corresponds to a transmitting signal vector x transmitted by one of the channels. In step 1004, a channel matrix H is determined, wherein the channel matrix H represents at least one of the channels. In step 1006, a factorization matrix D is chosen, wherein the factorization matrix D is invertible to make the channel matrix H=$\tilde{H}$D, and $\tilde{H}$ is a corresponding channel matrix. In step 1008, the factorization matrix D is determined to make an expected value of the signal estimate error become smaller. In step 1010, the receiving signal vector y is detected to estimate the transmitting signal vector x according to the corresponding channel matrix $\tilde{H}$ and the factorization matrix D.

Figure 9:
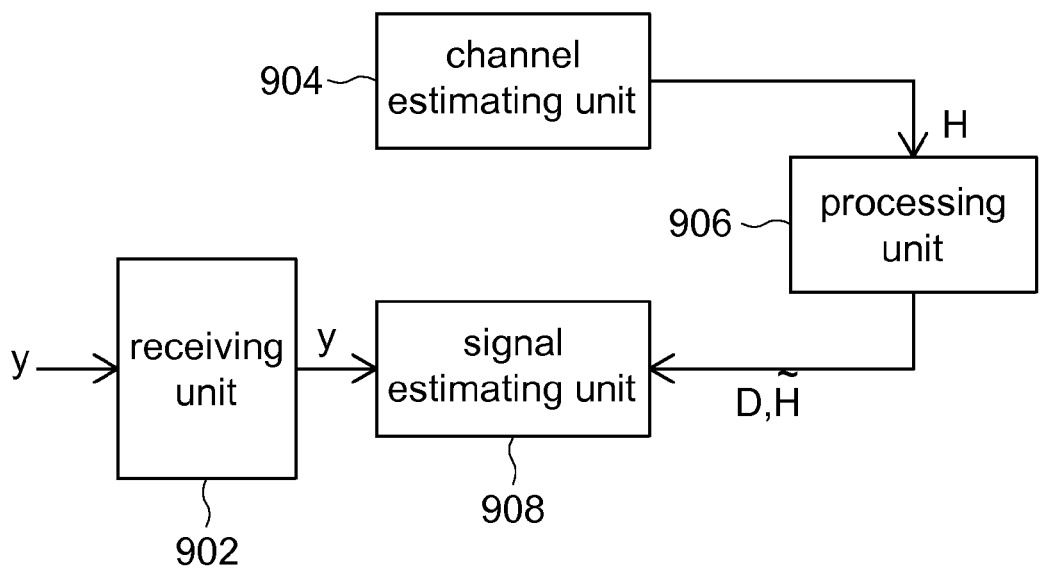
FIG. 9 shows an exemplary receiver according to the technology of an embodiment of the invention.

Referring to FIG. 9, an exemplary receiver according to the technology of an embodiment of the invention is shown. The abovementioned receiver includes a receiving unit 902, a channel estimating unit 904, a processing unit 906, and a signal estimating unit 908. The receiving unit 902 is used for receiving a receiving signal vector y through a number of channels. The channel estimating unit 904 is used for determining a channel matrix H. The processing unit 906 is used for choosing the factorization matrix D and determining the factorization matrix D to make an expected value of the signal estimate error smaller. The signal estimating unit 908 is used for detecting the receiving signal vector y according to the corresponding channel matrix H̃ and the factorization matrix D to estimate the transmitting signal vector x.

Furthermore, provided a channel factorization is given as H=H̃D, the abovementioned signal model y=Hx+n can be expressed as:

$$y=Hx+n=\tilde{H}Dx+n=\tilde{H}z+n \quad (2)$$

Wherein, a intermediate signal vector is defined as z=Dx.

Then, a detection matrix G is determined, a to-be-detected signal vector z̃ is determined according to the operation Gy of the detection matrix C and the receiving signal vector y, and the to-be-detected signal vector z̃ is used for determining the estimate ẑ of the intermediate signal vector z to estimate the estimate x̂ of the transmitting signal vector x, wherein the expected value of the signal estimate error is correlated with an expected value of an error between the to-be-detected signal vector z̃ and the intermediate signal vector z.

For example, after the operation Gy=GH̃z+Gn is obtained according to equation (2), if the detection matrix G is equal to H̃$^{-1}$, then Gy=z+Gn is easily obtained. Thus, of the many QAM symbols, the symbol closest to Gy is used as the estimate ẑ of the intermediate signal vector z so as to obtain the estimate x̂ of the transmitting signal vector x according to x=D$^{-1}$z. However, when the detection matrix G is equal to H̃$^{-1}$, the influence of noise will increase (that is, the value of G$^{-1}$n being too large), so it is hard to obtain a correct estimate ẑ. Therefore, by selecting a more suitable detection matrix G, the influence of noise during estimation is reduced.

Let the abovementioned to-be-detected signal vector z̃ be equal to Gy, and the abovementioned expected value of the signal estimate error be equal to the expected value of $\|Gy-z\|^2 (=\|\tilde{z}-z\|^2)$. Moreover, let the detection matrix G be a minimum mean square error (MMSE) detection matrix $G_{MMSE}$ for obtaining the expected value of the signal estimate error to estimate the intermediate signal vector z.

According to the current communication theory, the abovementioned detection matrix $G_{MMSE}$ is expressed as:

$$G_{MMSE} = \arg\min_G E[\|Gy-z\|^2] = D\left(H^H H + \frac{\sigma_n^2}{\sigma_x^2} I_{n_t}\right)^{-1} H^H \quad (3)$$

Wherein $$G_{MMSE} = D\left(H^H H + \frac{\sigma_n^2}{\sigma_x^2} I_{n_t}\right)^{-1} H^H,$$

$H^H$ is a Hermitian matrix of the channel matrix H, $\sigma_n^2$ is the variance of noise vector n, $\sigma_x^2$ is the variance of the transmitting signal vector x, $n_t$ is the number of elements of the transmitting signal vector x, and $I_{n_t}$ is an $n_t \times n_t$ unit matrix.

Then, the covariance matrix $\Phi_{MMSE}$ of the error vector $G_{MMSE}y-z$ which occurs when the detection matrix $G_{MMSE}$ is obtained according to:

$$\Phi_{MMSE} = E[(G_{MMSE}y - z)(G_{MMSE}y - z)^H] = \quad (4)$$

$$\sigma_n^2 D\left(H^H H + \frac{\sigma_n^2}{\sigma_x^2} I_{n_t}\right)^{-1} D^H = DAD^H$$

Wherein the first intermediate matrix $$A = \sigma_n^2\left(H^H H + \frac{\sigma_n^2}{\sigma_x^2} I_{n_t}\right)^{-1}$$

is a Hermitian matrix for example.

As indicated in equation (4), the mean square error (MSE) of the elements of the intermediate signal vector z are the diagonal elements of the corresponding covariance matrix $\Phi_{MMSE}$ and are related with the factorization matrix D. That is, the factorization of the channel matrix H will determine the MSE of the intermediate signal vector z. As the detection of the intermediate signal vector z is implemented by simple rounding operation, given that the minimal distance (that is, 1) is fixed during detection, it is a key object to improve the error rate performance by minimizing the MSE during detection.

In the abovementioned step of determining the factorization matrix D, the factorization matrix D is changed by making the sum of diagonal elements of the covariance matrix $\Phi_{MMSE}=DAD^H$ smaller. The first intermediate matrix A is not limited to the first intermediate matrix A defined by equation (4). Any first intermediate matrix A correlated with the channel matrix H and a signal to noise ratio will do. Meanwhile, the expected value of the signal estimate error is the diagonal elements of the covariance matrix $\Phi_{MMSE}$.

How to search for the optimal factorization matrix D to minimize the MSE $E[\|Gy-z\|^2]$ is exemplified by two embodiments below.

First Embodiment

According to the above disclosure, provided that the channel matrix H, $\sigma_x^2$ and $\sigma_n^2$ are given (that is, A is given), the invention obtains a suitable factorization matrix D. Suppose the channel factorization result is H=H̃D, the invention aims at making the sum of the diagonal elements of the covariance matrix $\Phi_{MMSE}=DAD^H$ smaller, that is, making the tr($\Phi_{MMSE}$) smaller, wherein tr(●) denotes the sum of the diagonal elements of the matrix. As the factorization matrix D is a transformation bridge between the intermediate signal vector z and the output signal x (that is, z=Dx), the factorization matrix D must be invertible. Also, in order to simplify the complexity of the intermediate signal vector z, the present embodiment of the invention is preferably implemented by simple rounding operation, and preferably, the elements of the factorization matrix D are integers.

For example, the present embodiment of the invention sets the factorization matrix as D=$I_{n_t}$ at the beginning, and then each row of the factorization matrix D is recursively updated by way of updating one row at a time from the first row to the last row (that is, the $n_t$-th row) until the $n_t$ rows are all updated, and thus a cycle of iteration is completed.

After a cycle of iteration is completed, a decision regarding whether to enter the next iteration or to terminate the detecting method is made according to stopping criterion. The detecting procedures in a cycle of iteration and the stopping criterion are disclosed below.

Let the updating of the k-th row be taken as an example, and other rows can be updated in the same way. Let equation (4) be expressed as:

$$\Phi_{MMSE} = DAD^H = \begin{bmatrix} d_{[1,:]} \\ \vdots \\ d_{[n_t,:]} \end{bmatrix} A \begin{bmatrix} d_{[1,:]}^H & \cdots & d_{[n_t,:]}^H \end{bmatrix} \quad (5)$$

The k-th diagonal element of covariance matrix $\Phi_{MMSE}$ represents the MSE $mse_k$ when detecting the k-th element $z_k$ of the intermediate signal vector z, wherein $k=1, \ldots, n_t$, and $mse_k$ is expressed as:

$$mse_k = d_{[k,:]} A d_{[k,:]}^H, k=1, \ldots, n_t \quad (6)$$

Wherein $d_{[k,:]}$ denotes the vector formed by the elements of the k-th row of the factorization matrix D. As indicated in equation (6), provided the matrix A is given, the MSE when detecting the k-th element $z_k$ of the intermediate signal vector z is only correlated with the elements of the k-th row (that is, $d_{[k,:]}$) of the factorization matrix D, so the updating of $d_{[k,:]}$ affects $mse_k$ only, and no $mse_{k'}, k' \neq k$ will be affected.

The method of updating the factorization matrix D can be achieved by way of changing one row vector of the factorization matrix D as the sum of a linear combination of other row vectors and the abovementioned one row vector. For example, the updating of the factorization matrix D is expressed as:

$$d_{[k,:]}^{new} = \alpha_1 * d_{[1,:]} + \cdots + \alpha_{k-1} * d_{[k-1,:]} + d_{[k,:]} + \alpha_{k+1} * d_{[k+1,:]} + \cdots + \alpha_{n_t} * d_{[n_t,:]} \quad (7)$$

Wherein $\alpha_1, \ldots, \alpha_{k-1}, \alpha_{k+1}, \ldots, \alpha_{n_t}$ are the parameters to be obtained next. According to equation (6), the updated MSE is expressed as:

$$\begin{aligned} mse_k^{new} &= d_{[k,:]}^{new} A (d_{[k,:]}^{new})^H \quad (8) \\ &= (\alpha_1^* d_{[1,:]} + \ldots + \alpha_{k-1}^* d_{[k-1,:]} + d_{[k,:]} + \\ &\quad \alpha_{k+1}^* d_{[k+1,:]} + \ldots + \alpha_{n_t}^* d_{[n_t,:]}) \cdot \\ &\quad A \cdot (\alpha_1^* d_{[1,:]} + \ldots + \alpha_{k-1}^* d_{[k-1,:]} + d_{[k,:]} + \\ &\quad \alpha_{k+1}^* d_{[k+1,:]} + \ldots + \alpha_{n_t}^* d_{[n_t,:]})^H \\ &= [\alpha_1^H \quad 1 \quad \alpha_2^H] B \begin{bmatrix} \alpha_1 \\ 1 \\ \alpha_2 \end{bmatrix} \end{aligned}$$

Wherein $\alpha_1 = [\alpha_1 \ \ldots \ \alpha_{k-1}]^T$, $\alpha_2 = [\alpha_{k+1} \ \ldots \ \alpha_{n_t}]^T$ and $B = DAD^H$.

Let $$D_1 = \begin{bmatrix} d_{[1,:]} \\ \vdots \\ d_{[k-1,:]} \end{bmatrix} \text{ and } D_2 = \begin{bmatrix} d_{[k+1,:]} \\ \vdots \\ d_{[n_t,:]} \end{bmatrix},$$

then the matrix B can be partitioned as:

$$B = \begin{bmatrix} D_1 A D_1^H & D_1 A d_{[k,:]}^H & D_1 A D_2^H \\ d_{[k,:]} A D_1^H & d_{[k,:]} A d_{[k,:]}^H & d_{[k,:]} A D_2^H \\ D_2 A D_1^H & D_2 A d_{[k,:]}^H & D_2 A D_2^H \end{bmatrix} = \begin{bmatrix} B_{1,1} & B_{1,2} & B_{1,3} \\ B_{2,1} & B_{2,2} & B_{2,3} \\ B_{3,1} & B_{3,2} & B_{3,3} \end{bmatrix} \quad (9)$$

So, equation (8) can also be expressed as:

$$\begin{aligned} mse_k^{new} &= [\alpha_1^H \quad 1 \quad \alpha_2^H] \begin{bmatrix} B_{1,1} & B_{1,2} & B_{1,3} \\ B_{2,1} & B_{2,2} & B_{2,3} \\ B_{3,1} & B_{3,2} & B_{3,3} \end{bmatrix} \begin{bmatrix} \alpha_1 \\ 1 \\ \alpha_2 \end{bmatrix} \quad (10) \\ &= [\alpha_1^H \quad \alpha_2^H] \begin{bmatrix} B_{1,1} & B_{1,3} \\ B_{3,1} & B_{3,3} \end{bmatrix} \begin{bmatrix} \alpha_1 \\ \alpha_2 \end{bmatrix} + [\alpha_1^H \quad \alpha_2^H] \begin{bmatrix} B_{1,2} \\ B_{3,2} \end{bmatrix} + \\ &\quad [B_{2,1} \quad B_{2,3}] \begin{bmatrix} \alpha_1 \\ \alpha_2 \end{bmatrix} + B_{2,2} \\ &= \alpha^H C_{2,2} \alpha + \alpha^H C_{2,1} + C_{1,2} \alpha + C_{1,1} \end{aligned}$$

Wherein $$\alpha = \begin{bmatrix} \alpha_1 \\ \alpha_2 \end{bmatrix}, C_{2,2} = \begin{bmatrix} B_{1,1} & B_{1,3} \\ B_{3,1} & B_{3,3} \end{bmatrix}, C_{2,1} = \begin{bmatrix} B_{1,2} \\ B_{3,2} \end{bmatrix},$$

$$C_{1,2} = \lfloor B_{2,1} \quad B_{2,3} \rfloor \text{ and } C_{1,1} = B_{2,2}.$$

Next, the equation (10) is differentiated with respect to $\alpha$, and the solution obtained by setting the equation equal to 0 is expressed as:

$$\alpha_{opt} = \begin{bmatrix} \alpha_{1,opt} \\ \alpha_{2,opy} \end{bmatrix} = -C_{2,2}^{-1} C_{2,1} \quad (11)$$

Therefore, $$d_{[k,:]}^{new} = [\alpha_{1,opt}^H \quad 1 \quad \alpha_{2,opt}^H] D \quad (12)$$

As the $\alpha_{opt}$ obtained from the equation (11) may not be an integer, the elements of the $d_{[k,:]}^{new}$ of the equation (12) may not be integers either. To simplify calculation, local integer points search can be applied to the neighborhood of the obtained $\alpha_{opt}$ to make the elements of the factorization matrix D be integers.

Lastly, the $\alpha^{upd}$ that really needs to be updated can be obtained according to the following equation (13):

$$\alpha^{upd} = \arg\min_{\alpha \in \Psi_\alpha} [\alpha_1^H \quad 1 \quad \alpha_2^H] B \begin{bmatrix} \alpha_1 \\ 1 \\ \alpha_2 \end{bmatrix} \text{ and } \quad (13)$$

$$\Psi_\alpha = \{\alpha = [\alpha_1 \ldots \alpha_{k-1} \alpha_{k+1} \ldots \alpha_{n_t}]^T, \alpha_j \in \Psi_{\alpha,j}\}$$

Wherein $\Psi_{\alpha,j}$ is a set of many integer points closest to the $\lfloor \alpha_{opt} \rfloor_j$, and $\lceil \alpha_{opt} \rceil_j$, $j=1, \ldots, n_t-1$ denotes the j-th element of the vector $\alpha_{opt}$.

The numeric result shows that after the number of elements in the set $\Psi_{\alpha,j}$ is over 2, the improvement in performance is insignificant, so the balance between performance and complexity is obtained by setting $$|\Psi_{\alpha,j}| = 2, \forall j. \quad (14)$$

Thus $$d_{[k,:]}^{upd} = \lfloor (\alpha_1^{upd})^H \quad 1 \quad (\alpha_2^{upd})^H \rfloor D$$

$$mse_k^{upd} = d_{[k,:]}^{upd} A (d_{[k,:]}^{upd})^H \quad (15)$$

Lastly, if $mse_k^{upd}<mse_k$, then $d_{[k,:]}$ is updated (that is, $d_{[k,:]} = d_{[k,:]}^{upd}$); otherwise, $d_{[k,:]}$ is not updated.

According to the above disclosure, a cycle of iteration is completed by sequentially updating all rows. The abovementioned stopping criterion is:

If none row is updated in a cycle of iteration; or

The number of iteration already achieves a predetermined number $N_1$, then the detecting method terminates, and the factorization matrix D lastly updated is outputted.

Referring to Table 1, a part of the pseudo code of the abovementioned detecting method is disclosed below:

TABLE 1

Input: Channel matrix H, $\sigma_x^2$, $\sigma_n^2$, and $D = I_{n_t}$, $N_I$: the number of iteration.
Output: D: An invertible complex-integer matrix.

Figure 3A:
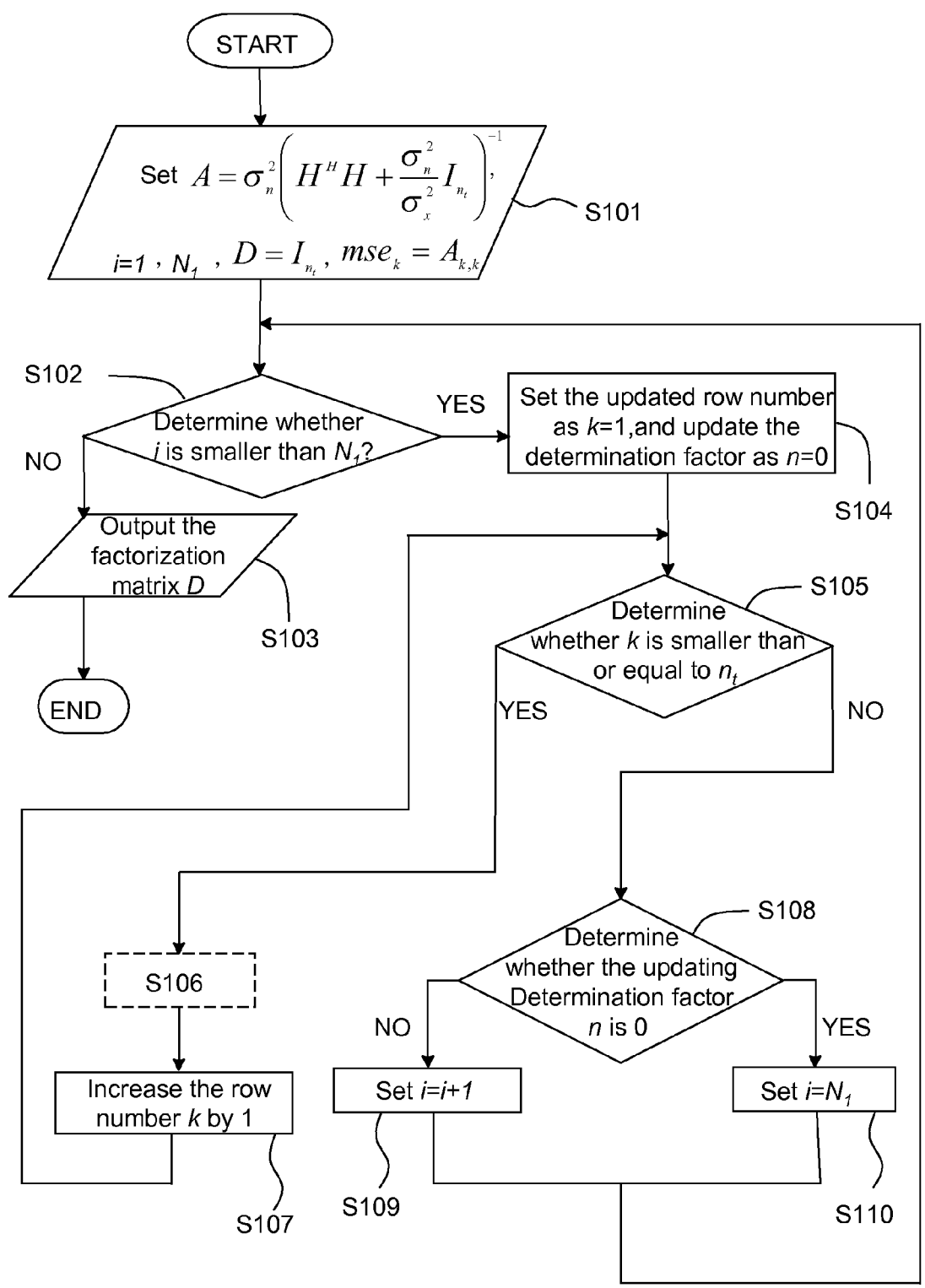
FIGS. 3A~3B show the steps of an exemplary flowchart of searching for a factorization matrix according to the technology of a first embodiment of the invention.
Figure 3B:
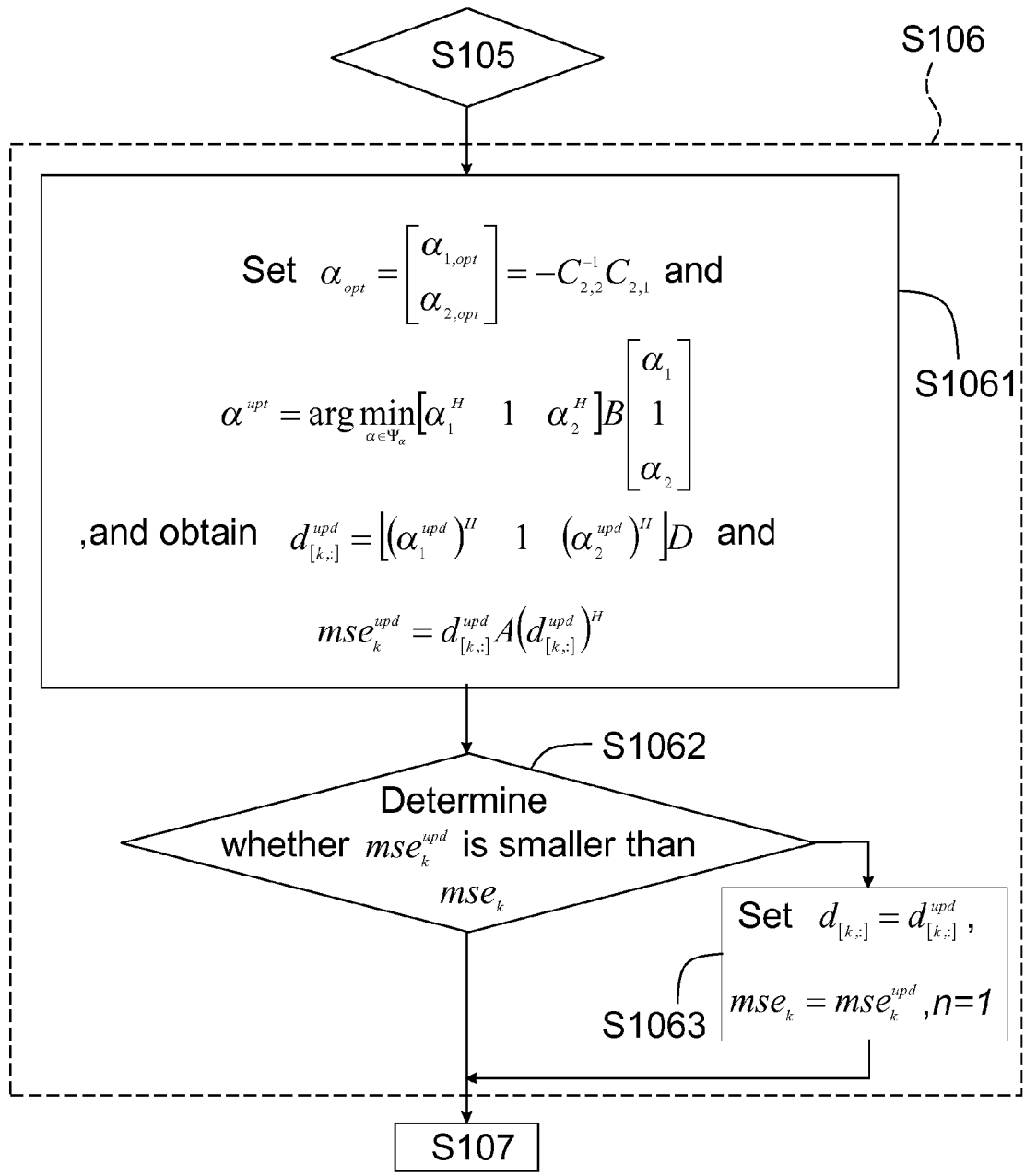

1: i = 0
2: while (i < $N_I$) do
3:     for k = 1 to $n_t$, do
4:         
$$\alpha_{opt} = -C_{2,2}^{-1}C_{2,1}, \text{ and } \alpha^{upd} = \arg\min_{\alpha \in \Psi_\alpha}[\alpha_1^H \ 1 \ \alpha_2^H] B \begin{bmatrix} \alpha_1 \\ 1 \\ \alpha_2 \end{bmatrix}$$
5:         $d_{[k,:]}^{upd} = [(\alpha_1^{upd})^H \ 1 \ (\alpha_2^{upd})^H]D$, and $mse_k^{upd} = d_{[k,:]}^{upd} A (d_{[k,:]}^{upd})^H$
6:         if ($mse_k^{upd} < mse_k$), then
7:             $d_{[k,:]} = d_{[k,:]}^{upd}$, $mse_k = mse_k^{upd}$
8:         end if
9:     end for
10:    if (no update for all k = 1 to $n_t$), then
11:        i = $N_I$
12:    else
13:        i = i + 1
14:    end if
15: end while Referring to FIG. 3A~3B, the steps of an exemplary flowchart of searching for a factorization matrix according to the technology of a first embodiment of the invention are shown.

Firstly, the method begins at step S101, the matrix A is set as:

$$A = \sigma_n^2 \left( H^H H + \frac{\sigma_n^2}{\sigma_x^2} I_{n_t} \right)^{-1}, i = 0, N_1, D = I_{n_t}, mse_k = A_{k,k}.$$

Next, the method proceeds to step S102, whether i is smaller than $N_1$ is determined (that is, whether the number of iteration is smaller than $N_1$ is determined). If i is not larger than $N_1$, then the method proceeds to step S103; if i is smaller than $N_1$, then the method proceeds to step S104.

In step S103, as the number of iteration already achieves $N_1$, the factorization matrix D is outputted.

In step S104, the updated row number is set as k=1, and the determination factor is updated as n=0.

Then, the method proceeds to step S105, whether k is smaller than or equal to $n_t$ is determined (that is, whether the last row is updated is determined). If k is smaller than or equal to $n_t$, then the method proceeds to step S106; if k is larger than $n_t$, then the method proceeds to step S108.

In step S106, the k-th row of the factorization matrix D is updated.

As indicated in FIG. 3, step S106 includes several sub-steps S1061, S1062 and S1063.

In step S1061, it is set that $$\alpha_{opt} = \begin{bmatrix} \alpha_{1,opt} \\ \alpha_{2,opt} \end{bmatrix} = -C_{2,2}^{-1}C_{2,1} \text{ and}$$

$$\alpha^{upt} = \arg\min_{\alpha \in \Psi_\alpha}[\alpha_1^H \ 1 \ \alpha_2^H] B \begin{bmatrix} \alpha_1 \\ 1 \\ \alpha_2 \end{bmatrix},$$

and it is obtained that $d_{[k,:]}^{upd} = [(\alpha_1^{upd})^H \ 1 \ (\alpha_2^{upd})^H]D$ and $mse_k^{upd} = d_{[k,:]}^{upd} A(d_{[k,:]}^{upd})^H$.

In step S1062, whether $mse_k^{upd}$ is smaller than $mse_k$ is determined. If $mse_k^{upd}$ is smaller than $mse_k$, then the method proceeds to step S1063; if $mse_k^{upd}$ is not smaller than $mse_k$, then the method proceeds to step S107.

In step S1063, it is set that $d_{[k,:]} = d_{[k,:]}^{upd}$, $mse_k = mse_k^{upd}$, n=1.

In step S107, the row number k is increased by 1.

Then, the method returns to step S105, whether k is smaller than or equal to $n_t$ is determined.

In step S105, if k is larger than $n_t$, then the method proceeds to step S108.

In step S108, whether the updating determination factor n is 0 is determined. If the updating determination factor n is not 0, then the method proceeds to step S109; if the updating determination factor n is 0, then the method proceeds to step S110.

In step S109, i is set as i=i+1.

In step S110, i is set as i=$N_1$.

Then, the method returns to step S102.

Figure 4:
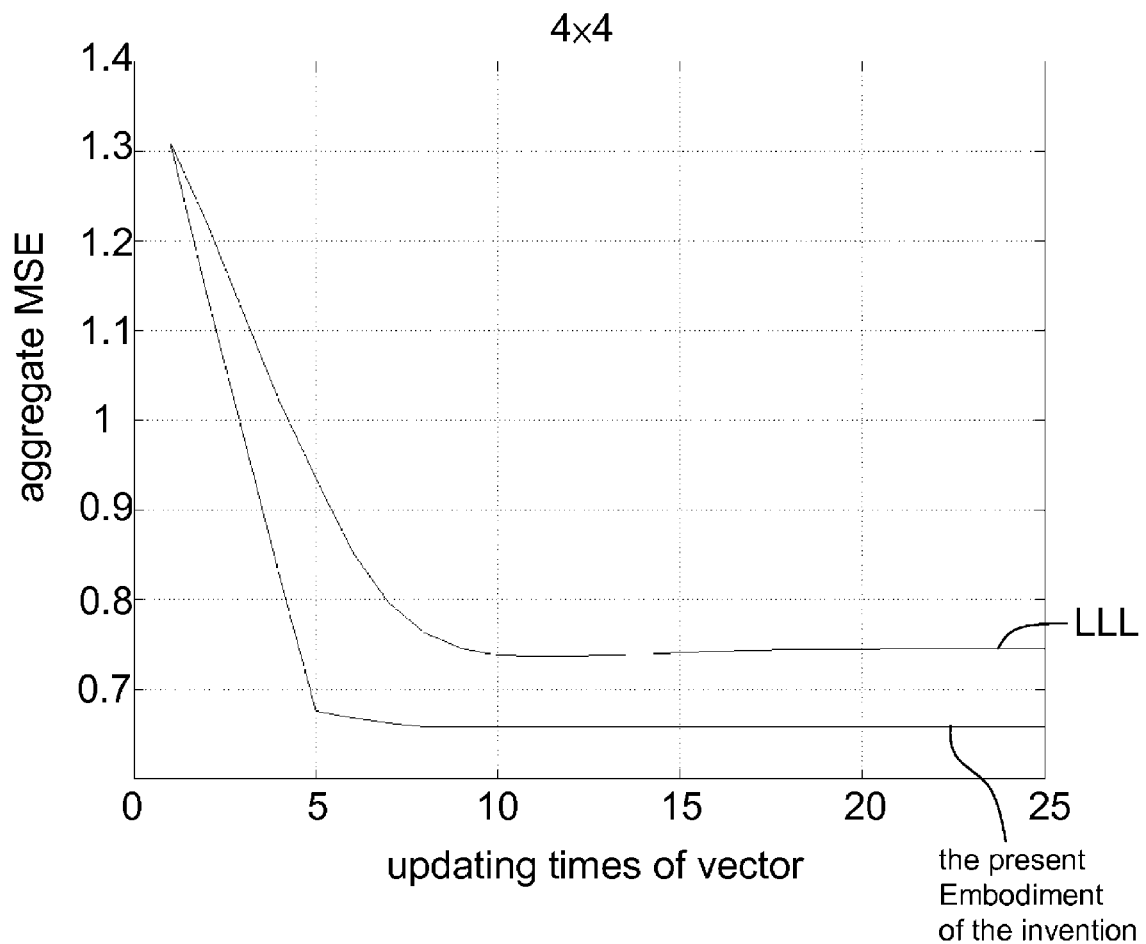
FIGS. 4~5D show the comparison of the curves of the aggregate MSE of the intermediate signal vector z obtained every time the factorization vector is updated during the factorization process under the same channel ($n_t=n_r=4$) vs. updating times between the detecting method of the technology of a first embodiment of the invention and the conventional LLL method.
Figure 5A:
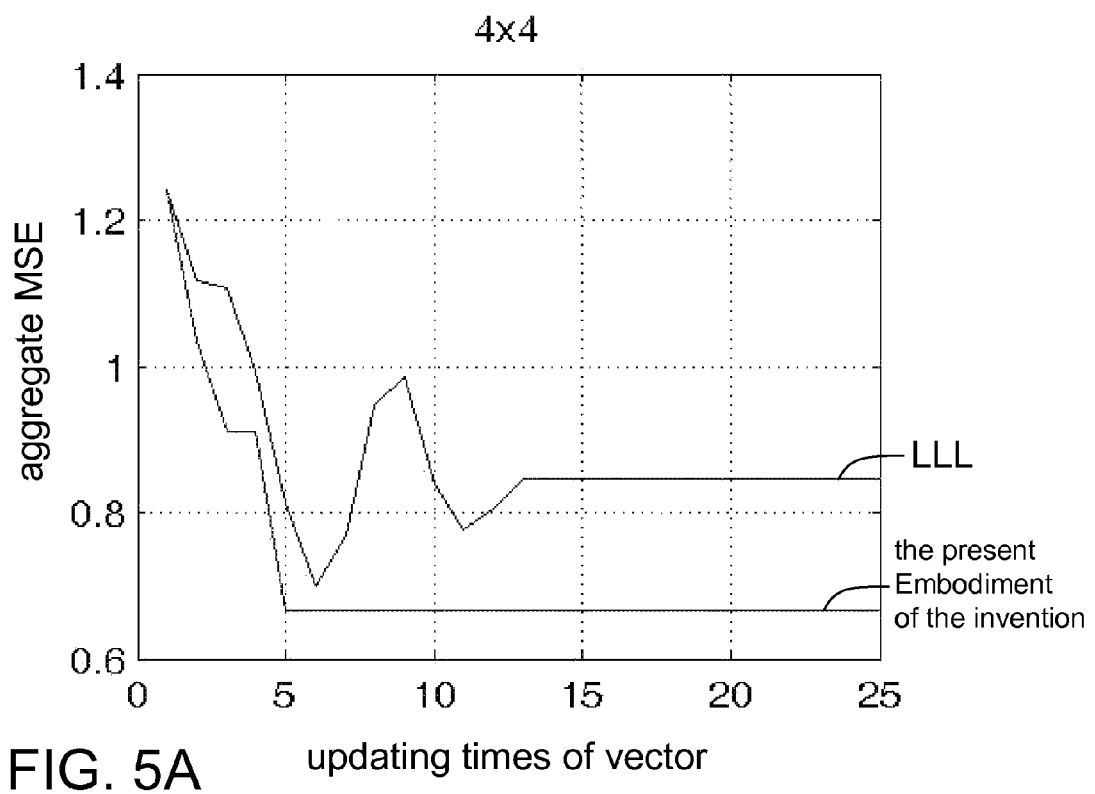
Figure 5B:
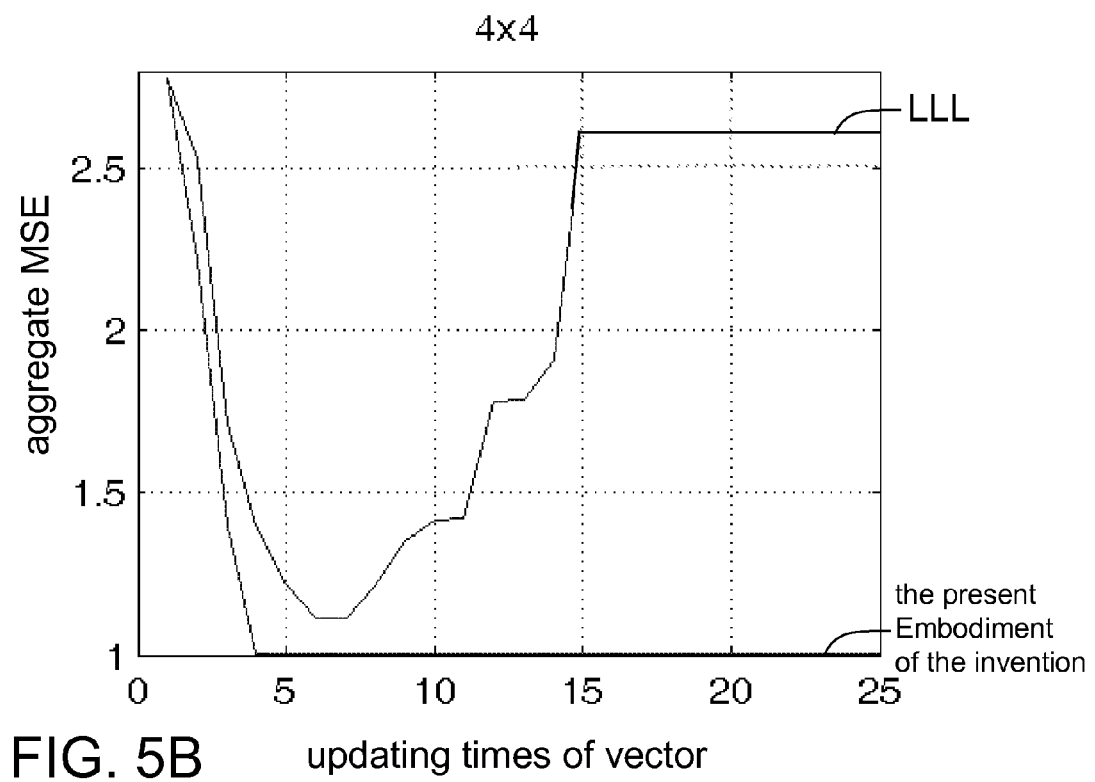
Figure 5C:
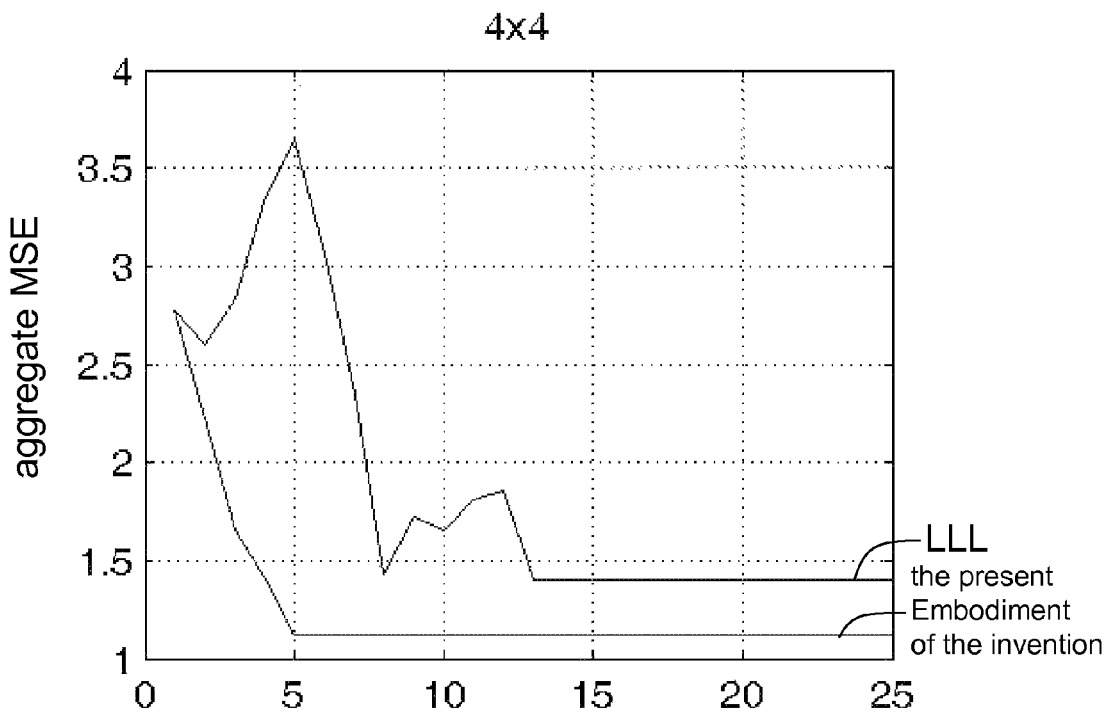
Figure 5D:
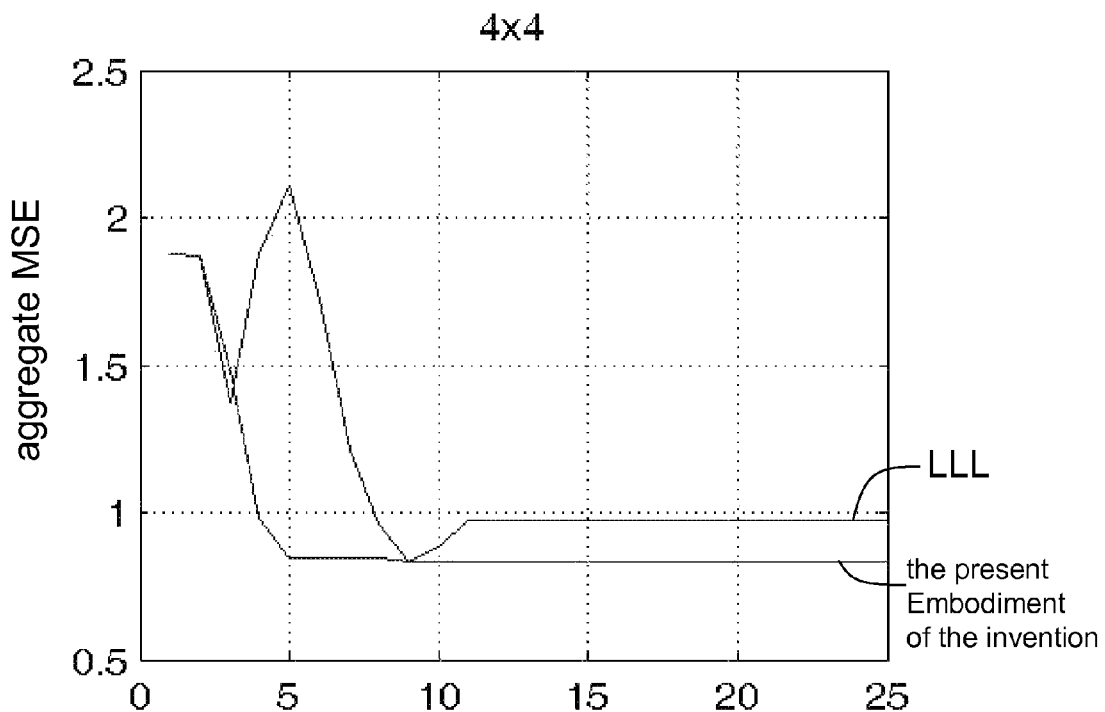

In the above example, the factorization matrix D is changed though recursive operation by way of changing one row at a time. However the present embodiment of the invention can also obtain the factorization matrix D by a searching method to make the expected value of the signal estimate error become smaller The effects of the present embodiment of the invention are exemplified in the following experimental diagrams. Referring to FIGS. 4~5D, the comparison of the curves of the aggregate MSE of the intermediate signal vector z obtained every time the factorization vector is updated during the factorization process under the same channel ($n_t=n_r=4$) vs. updating times between the detecting method of the technology of a first embodiment of the invention and the conventional LLL method are shown.

FIG. 4 shows the average of the results of more than ten thousand times of channel realization. As indicated in FIG. 4, the detecting method provided in the present embodiment of the invention is superior to the conventional LLL method no matter in terms of the rate of improving the aggregate MSE (the rate of convergence) or the aggregate performance of the lastly obtained MSE.

Besides, during the operation of the conventional LLL method, the aggregate MSE does not necessarily become smaller despite the MSE shows an overall decreasing tendency (for the channel after average). FIGS. 5A~5D show the comparison between two detecting method applied to four randomly selected channels. As indicated in FIG. 5A~5D, the detecting method of the present embodiment of the invention strictly improves the performance, but the MSE obtained according to the conventional LLL method oscillates during the process of operation, and the result of factorization obtained finally may not be the best (in terms of the aggregate MSE).

Figure 6:
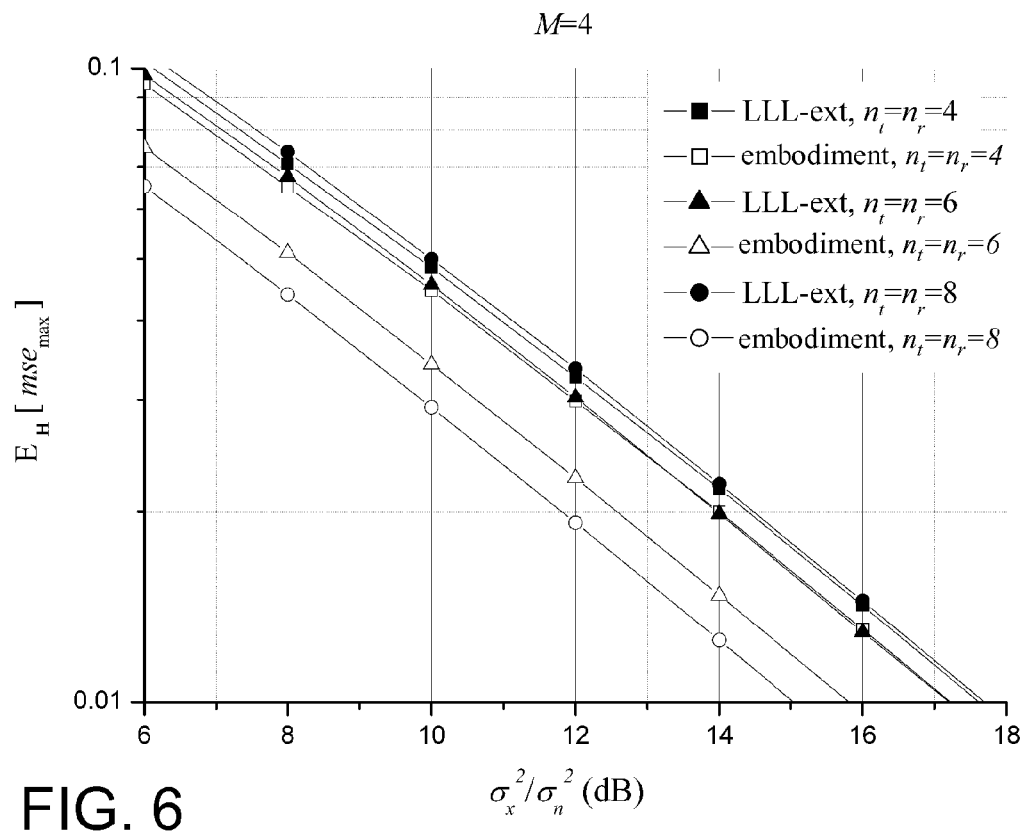
FIG. 6 shows the comparison of the curves of the MSE of the intermediate signal vector z detected after channel factorization vs. the signal to noise power ratio between the detecting method of the technology of a first embodiment of the invention and the conventional LLL method.

Referring to FIG. 6, the comparison of the curves of the MSE of the intermediate signal vector z detected after channel factorization vs. the signal to noise power ratio between the detecting method of the technology of a first embodiment of the invention and the conventional LLL method is shown. As indicated in FIG. 6, $mse_{max}$ of the vertical axis is max{diag $(\Phi_{MMSE})$}, wherein diag$(\Phi_{MMSE})$ denotes all the diagonal elements of the matrix $\Phi_{MMSE}$, and the largest MSE is an important index affecting the overall error rate performance. $E_H[mse_{max}]$ denotes that Monte Carlo integration is applied to the channel matrix H. FIG. 6 shows the comparison among three different numbers of antennas $n_t=n_r=4, 6, 8$. Let M=4 (4-QAM), the improvement achieved by the detecting method of the present embodiment of the invention ranges from 0.5 dB to 2.5 dB (depend on the number of antennas).

Figure 7:
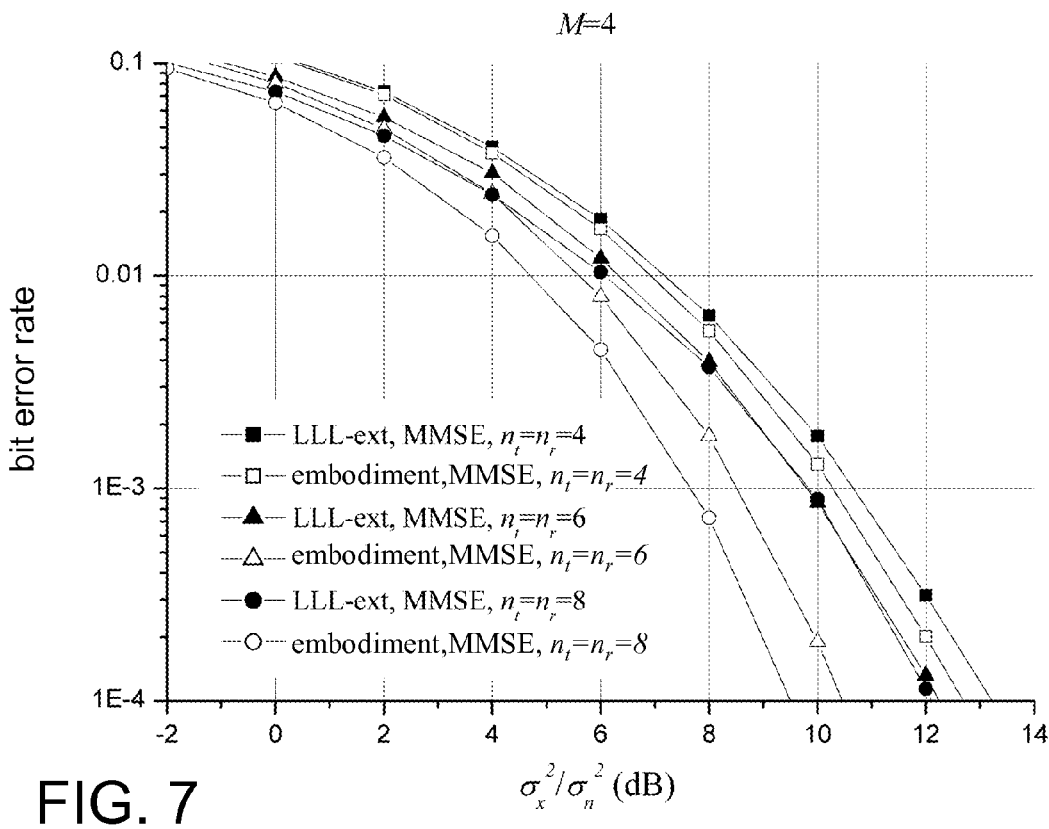
FIG. 7 shows the comparison of the curves of bit error rate performance vs. the signal to noise power ratio between the detecting method of the technology of a first embodiment of the invention and the conventional LLL method.

Referring to FIG. 7, the comparison of the curves of bit error rate performance vs. the signal to noise power ratio between the detecting method of the technology of a first embodiment of the invention and the conventional LLL method is shown. As indicated in FIG. 7, a result similar to FIG. 6 is obtained. That is, when the number of antennas increases from $n_t=n_r=4$ to $n_t=n_r=8$, the achieved improvement ranges from 0.5 dB to 2.5 dB.

The present embodiment of the invention effectively overcomes the difficulties occurring to conventional technologies, and further provides a detecting method which adjusts the complexity of operation according to actual needs of hardware. Moreover, the operation of the detecting method of the present embodiment of the invention is based on the performance index which reflects improvement in the performance of the error rate of the signal detection, that is, the MSE during detection is minimized.

Second Embodiment

The present embodiment of the invention provides another method for searching for an optimum factorization matrix D in step (d) so as to minimize the sum of the diagonal elements of the covariance matrix $\Phi_{MMSE}=DAD^H$.

Furthermore, provided a channel factorization is given as H=$\tilde{H}$D, the abovementioned signal model y=Hx+n can be expressed as:

$$y=Hx+n=\tilde{H}DX+n=\tilde{H}z+n \qquad (16)$$

Next, the minimum mean square error (MMSE) is used as a criterion in detecting the intermediate signal vector z. Firstly, let the detection matrix $G_{MMSE}$ be expressed as:

$$G_{MMSE} = \arg\min_G E[\|Gy-z\|^2] = D\left(H^H H + \frac{\sigma_n^2}{\sigma_x^2}I_{n_t}\right)^{-1} H^H \qquad (17)$$

Then, the covariance matrix $\Phi_{MMSE}$ of the error vector $G_{MMSE}y-z$ which occurs when the detection matrix $G_{MMSE}$ is obtained according to:

$$\Phi_{MMSE} = E[(G_{MMSE}y-z)(G_{MMSE}y-z)^H] = \qquad (18)$$

$$\sigma_n^2 D\left(H^H H + \frac{\sigma_n^2}{\sigma_x^2}I_{n_t}\right)^{-1} D^H = DAD^H$$

Wherein the first intermediate matrix $$A = \sigma_n^2\left(H^H H + \frac{\sigma_n^2}{\sigma_x^2}I_{n_t}\right)^{-1}$$

is a Hermitian matrix for example.

Provided the result of the channel factorization is H=$\tilde{H}$D, the following method is adopted to make the sum of the diagonal elements of the covariance matrix $\Phi_{MMSE}=DAD^H$ smaller (that is, to make $$tr(\Phi_{MMSE}) = \sum_{k=1}^{n_t} mse_k = \sum_{k=1}^{n_t} d_{[k,:]} A d_{[k,:]}^H$$

as smaller as possible).

After the covariance matrix $\Phi_{MMSE}=DAD^H$ is determined, the first intermediate matrix A is factorized as A=$R^H$R, wherein R is a second intermediate matrix. Then, the second intermediate matrix R is factorized according to the LLL method, and the factorization matrix D is changed accordingly, wherein A can be other intermediate matrix correlated with the channel matrix H and a signal to noise ratio, and the second intermediate matrix R is factorized many times in the LLL method. The factorization matrix D is directly obtained from the factorization result R=$\tilde{R}$T of the second intermediate matrix R finally obtained so as to achieve the object of the invention without having to recursively change the factorization matrix D for several times.

In greater details, if the matrix A is transformed as A=$R^H$R, then tr$(\Phi_{MMSE})$ can be expressed as:

$$tr(\Phi_{MMSE}) = \qquad (19)$$

$$\sum_{k=1}^{n_t} mse_k = \sum_{k=1}^{n_t} d_{[k,:]} A d_{[k,:]}^H = \sum_{k=1}^{n_t} d_{[k,:]} R^H R d_{[k,:]}^H = \sum_{k=1}^{n_t} \|R d_{[k,:]}^H\|^2$$

That is, $n_t$ reasonable short lattice points $\{Rd_{[k,:]}^H\}_{k=1}^{n_t}$ are obtained during the process of minimizing the sum of the diagonal elements of the covariance matrix $\Phi_{MMSE}=DAD^H$ so as to minimize the sum of Euclidean square norm.

Therefore, the present embodiment of the invention adopts LLL method, and R is expressed $\tilde{R}$T so as to obtain the following equations:

$$R \xrightarrow{LLL} \tilde{R}T \qquad (20)$$

$$R = \tilde{R}T \Leftrightarrow RT^{-1} = \tilde{R} \qquad (21)$$

$$Rd_{[k,:]}^H = \tilde{R}Td_{[k,:]}^H = [\tilde{r}_1, \ldots, \tilde{r}_{n_t}]Td_{[k,:]}^H \qquad (22)$$

$$\text{Let } Td_{[k,:]}^H = e_k, \text{ wherein } k = 1, \ldots, n_t \text{ and } e_k = \begin{bmatrix} 0 \\ \vdots \\ 1 \\ \vdots \\ 0 \end{bmatrix} \qquad (23)$$

So, $[Td_{[1,:]}^H, \ldots, Td_{[n_t,:]}^H] = T[d_{[1,:]}^H, \ldots, d_{[n_t,:]}^H] = TD^H = I_{n_t}$ (24)

And, $D = (T^{-1})^H$ (25)

The factorization matrix D is obtained according to equation (25).

Figure 8:
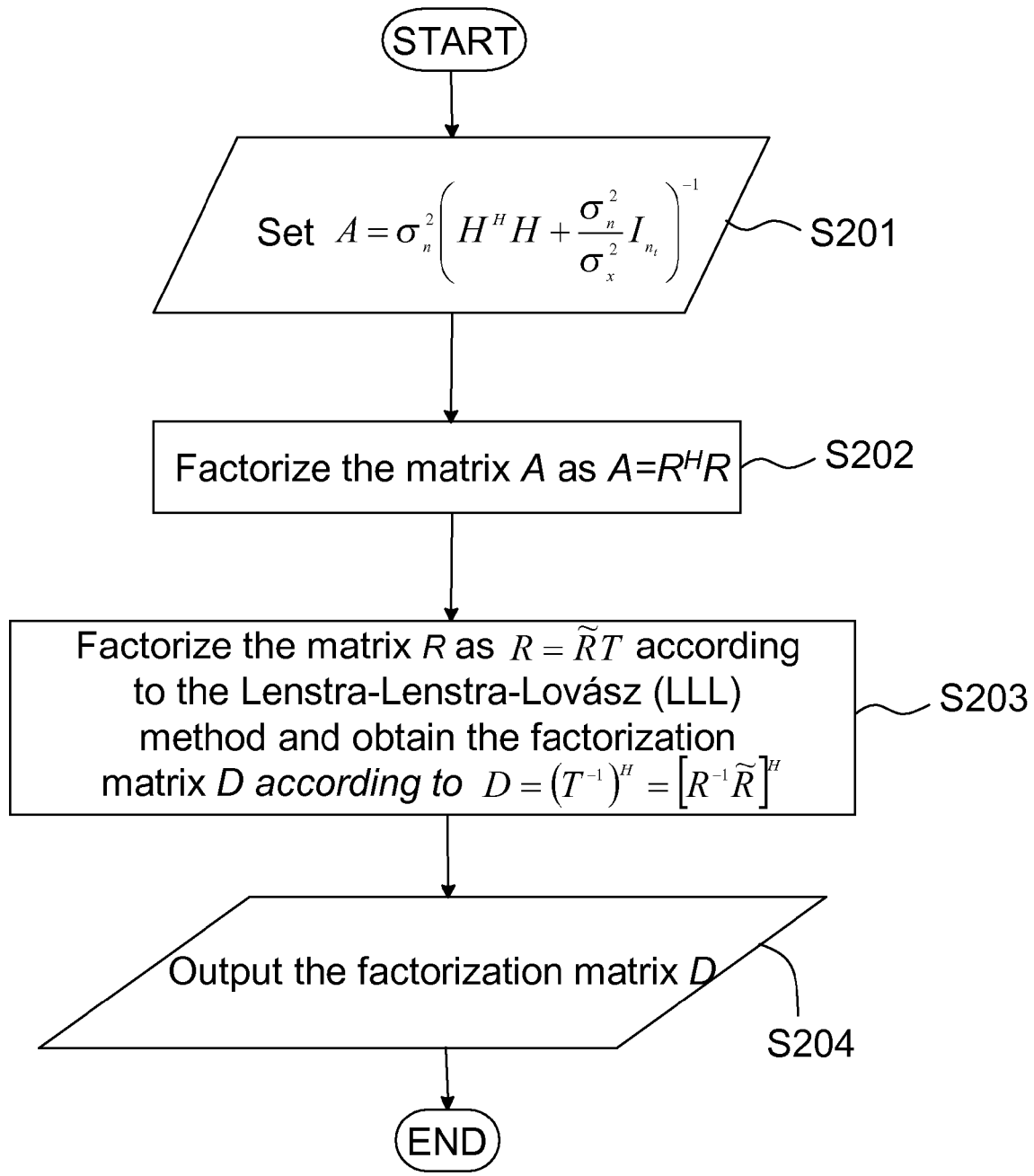
FIG. 8 show the steps of an exemplary flowchart of searching for a factorization matrix according to the technology of a second embodiment of the invention.

Referring to FIG. 8, the steps of an exemplary flowchart of searching for a factorization matrix according to the technology of a second embodiment of the invention are shown.

Firstly, the method begins at step S201, the matrix A is set as $$A = \sigma_n^2 \left( H^H H + \frac{\sigma_n^2}{\sigma_x^2} I_{n_t} \right)^{-1}.$$

Next, the method proceeds to step S202, the matrix A is factorized as $A = R^H R$.

Then, the method proceeds to step S203, the matrix R is factorized as $R = \tilde{R}T$ according to the Lenstra-Lenstra-Lovász (LLL) method, and the solution of the factorization matrix D is obtained according to $$D = (T^{-1})^H = [R^{-1}\tilde{R}]^H.$$

Then, the method proceeds to step S204, the factorization matrix D is outputted.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal detecting method, comprising:
receiving a receiving signal vector y through a number of channels, wherein the receiving signal vector y corresponds to a transmitting signal vector x transmitted by at least one of the channels;
determining a channel matrix H, wherein the channel matrix H represents at least one of the channels;
choosing a factorization matrix D, wherein the factorization matrix D is invertible to make the channel matrix H factorized as $H = \tilde{H}D$, $\tilde{H}$ is a corresponding channel matrix;
determining the factorization matrix D to make an expected value of the signal estimate error become smaller, wherein the step of determining the factorization matrix D comprises determining a covariance matrix $\Phi_{MMSE} = DAD^H$, wherein matrix A is a first intermediate matrix correlated with the channel matrix H and a signal to noise ratio; and
detecting the receiving signal vector y to estimate the transmitting signal vector x according to the corresponding channel matrix $\tilde{H}$ and the factorization matrix D.

2. The signal detecting method according to claim 1, further comprising:
determining a detection matrix G and defining a intermediate signal vector $z = Dx$, and determining a to-be-detected signal vector $\tilde{z}$ according to the operation Gy of the detection matrix G and the receiving signal vector y, wherein the to-be-detected signal vector $\tilde{z}$ is used for determining the estimate of the intermediate signal vector z to estimate the transmitting signal vector x, and the expected value of the signal estimate error is correlated with an expected value of an error between the to-be-detected signal vector $\tilde{z}$ and the intermediate signal vector z.

3. The signal detecting method according to claim 1, wherein in the step of determining the factorization matrix D, the factorization matrix D is changed by making the sum of the diagonal elements of the covariance matrix $\Phi_{MMSE} = DAD^H$ become smaller, and the expected value of the signal estimate error is correlated with the covariance matrix $\Phi_{MMSE}$.

4. The signal detecting method according to claim 1, wherein in the step of determining the factorization matrix D, the factorization matrix D is recursively updated by way of updating one row at a time.

5. The signal detecting method according to claim 1, wherein in the step of determining the factorization matrix D, one row vector of the factorization matrix D is changed as the sum of a linear combination of other row vectors and the abovementioned one row vector.

6. The signal detecting method according to claim 4, wherein in the step of determining the factorization matrix D, one row vector of the factorization matrix D is changed as the sum of a linear combination of other row vectors and the row vector.

7. The signal detecting method according to claim 1, wherein the step of determining the factorization matrix D further comprises:
factorizing the first intermediate matrix A as $A = R^H R$, wherein matrix R is a second intermediate matrix; and
factorizing the matrix R using Lenstra-Lenstra-Lovász (LLL) method and changing the factorization matrix D accordingly.

8. The signal detecting method according to claim 3, wherein the first intermediate matrix A is expressed as:

$$A = \sigma_n^2 \left( H^H H + \frac{\sigma_n^2}{\sigma_x^2} I_{n_t} \right)^{-1},$$

wherein $\sigma_n^2$ is the variance of a noise vector n, $\sigma_x^2$ the variance of the transmitting signal vector x, and $I_{n_t}$ is an $n_t \times n_t$ unit matrix.

9. The signal detecting method according to claim 7, wherein the first intermediate matrix A is expressed as:

$$A = \sigma_n^2 \left( H^H H + \frac{\sigma_n^2}{\sigma_x^2} I_{n_t} \right)^{-1},$$

wherein $\sigma_n^2$ is the variance of a noise vector n, $\sigma_x^2$ is the variance of the transmitting signal vector x, and $I_{n_t}$ is an $n_t \times n_t$ unit matrix.

10. The signal detecting method according to claim 2, wherein the detection matrix G is expressed as:

$$G = D \left( H^H H + \frac{\sigma_n^2}{\sigma_x^2} I_{n_t} \right)^{-1} H^H,$$

wherein $\sigma_n^2$ is the variance of a noise vector n, $\sigma_x^2$ is the variance of the transmitting signal vector x, and $I_{n_t}$ is an $n_t \times n_t$ unit matrix.

11. The signal detecting method according to claim 1, wherein the at least one of the channels is a multiple input multiple output (MIMO) channel or an orthogonal frequency division multiplexing-code division multiple access (OFDM-CDMA) channel.

12. The signal detecting method according to claim 1, further comprising:

determining a detection matrix G, defining a intermediate signal vector z=Dx, and determining a to-be-detected signal vector $\tilde{z}$ according to the operation Gy of the detection matrix G and the receiving signal vector y, wherein the to-be-detected signal vector $\tilde{z}$ is used for determining the estimate of the intermediate signal vector z to estimate the transmitting signal vector x, and the expected value of the signal estimate error is correlated with an expected value of an error between the to-be-detected signal vector $\tilde{z}$ and the intermediate signal vector z; and wherein in the step of determining the factorization matrix D, the factorization matrix D is changed by making the sum of diagonal elements of the covariance matrix $\Phi_{MMSE}$=DAD$^H$ become smaller and the expected value of the signal estimate error is correlated with the covariance matrix $\Phi_{MMSE}$.

13. The signal detecting method according to claim 12, wherein in the step of determining the factorization matrix D, the factorization matrix D is recursively updated by way of updating one row at a time.

14. The signal detecting method according to claim 13, wherein in the step of determining the factorization matrix D, one row vector of the factorization matrix D is changed as the sum of a linear combination of other row vectors and the row vector.

15. The signal detecting method according to claim 12, wherein in the step of determining the factorization matrix D, one row vector of the factorization matrix D is changed as the sum of a linear combination of other row vectors and the abovementioned one row vector.

16. The signal detecting method according to claim 12, wherein the detection matrix G is expressed as:

$$G = D\left(H^H H + \frac{\sigma_n^2}{\sigma_x^2} I_{n_t}\right)^{-1} H^H,$$

wherein $\sigma_n^2$ is the variance of a noise vector n, $\sigma_x^2$ is the variance of the transmitting signal vector x, and $I_{n_t}$ is an $n_t \times n_t$ unit matrix.

17. The receiver according to claim 7, wherein the matrix R is factorized as R=$\tilde{R}$T according to the Lenstra-Lenstra-Lovász (LLL) method, and a solution of the factorization matrix D is obtained according to D=(T$^{-1}$)$^H$=[R$^{-1}\tilde{R}$]$^H$.

18. A receiver, comprising:

a receiving unit is used for receiving a receiving signal vector y through a plurality of channels, wherein the receiving signal vector y corresponds to a transmitting signal vector x transmitted by at least one of the channels;

a channel estimating unit used for determining a channel matrix H, wherein the channel matrix H represents at least one of the channels;

a processing unit used for choosing a factorization matrix D and determining the factorization matrix D to make an expected value of the signal estimate error become smaller, wherein the factorization matrix D is invertible to make the channel matrix H factorized as H=$\tilde{H}$D, and $\tilde{H}$ is a corresponding channel matrix, wherein the processing unit is further used for determining a covariance matrix $\Phi_{MMSE}$=DAD$^H$, the matrix A is a first intermediate matrix correlated with the channel matrix H and a signal to noise ratio; and a signal estimating unit used for detecting the receiving signal vector y to estimate the transmitting signal vector x according to the corresponding channel matrix $\tilde{H}$ and the factorization matrix D.

19. The receiver according to claim 18, wherein the processing unit is further used for determining a detection matrix G, defining a intermediate signal vector z=Dx and further determining a to-be-detected signal vector $\tilde{z}$ according to the operation Gy of the detection matrix G and the receiving signal vector y, wherein the to-be-detected signal vector $\tilde{Z}$ is used for determining the estimate of the intermediate signal vector z so as to estimate the transmitting signal vector x, and the expected value of the signal estimate error is correlated with an expected value of an error between the to-be-detected signal vector $\tilde{z}$ and the intermediate signal vector z.

20. The receiver according to claim 18, wherein the processing unit is further used for changing D by making the sum of diagonal elements of the covariance matrix $\Phi_{MMSE}$=DAD$^H$ become smaller, and the expected value of the signal estimate error is correlated with the covariance matrix $\Phi_{MMSE}$.

21. The receiver according to claim 18, wherein the processing unit is further used for recursively updating the factorization matrix D by way of updating one row at a time.

22. The receiver according to claim 18, wherein the processing unit is further used for changing the factorization matrix D by changing one row vector of the factorization matrix D as the sum of a linear combination of other row vectors and the abovementioned one row vector.

23. The receiver according to claim 21, wherein the processing unit is further used for changing the factorization matrix D by changing one row vector of the factorization matrix D as the sum of a linear combination of other row vectors and the row vector.

24. The receiver according to claim 18, wherein the first intermediate matrix A is factorized as A=R$^H$R, the matrix R is a second intermediate matrix factorized according to Lenstra-Lenstra-Lovász (LLL) method so as to change the factorization matrix D.

25. The receiver according to claim 20, wherein the first intermediate matrix A is expressed as:

$$A = \sigma_n^2 \left(H^H H + \frac{\sigma_n^2}{\sigma_x^2} I_{n_t}\right)^{-1},$$

wherein $\sigma_n^2$ is the variance of a noise vector n, $\sigma_x^2$ is the variance of the transmitting signal vector x, and $I_{n_t}$ is an $n_t \times n_t$ unit matrix.

26. The receive according to claim 24, wherein the first intermediate matrix A is expressed as:

$$A = \sigma_n^2 \left(H^H H + \frac{\sigma_n^2}{\sigma_x^2} I_{n_t}\right)^{-1},$$

wherein $\sigma_n^2$ is the variance of a noise vector n, $\sigma_x^2$ is the variance of the transmitting signal vector x, and $I_{n_t}$ is an $n_t \times n_t$ unit matrix.

27. The receiver according to claim 19, wherein the detection matrix G is expressed as:

$$G = D\left(H^H H + \frac{\sigma_n^2}{\sigma_x^2} I_{n_t}\right)^{-1} H^H,$$

wherein $\sigma_n^2$ is the variance of a noise vector n, $\sigma_x^2$ is the variance of the transmitting signal vector x, and $I_{n_t}$ is an $n_t \times n_t$ unit matrix.

28. The receiver according to claim 18, wherein the at least one of the channels is a multiple input multiple output (MIMO) channel or an orthogonal frequency division multiplexing-code division multiple access (OFDM-CDMA) channel.

29. The receiver according to claim 18, wherein the processing unit is further used for determining a detection matrix G, defining a intermediate signal vector z=Dx and further determining a to-be-detected signal vector $\tilde{z}$ according to the operation Gy of the detection matrix G and the receiving signal vector y, wherein the to-be-detected signal vector $\tilde{z}$ is used for determining the estimate of the intermediate signal vector z so as to estimate the transmitting signal vector x, and the expected value of the signal estimate error is correlated with an expected value of an error between the to-be-detected signal vector $\tilde{z}$ and the intermediate signal vector z;

wherein the processing unit is further used for changing the factorization matrix D by making the sum of diagonal elements of the covariance matrix $\Phi_{MMSE}=DAD^H$ become smaller, the matrix A is a first intermediate matrix correlated with the channel matrix H and a signal to noise ratio, and the expected value of the signal estimate error is correlated with the covariance matrix $\Phi_{MMSE}$.

30. The receiver according to claim 29, wherein the processing unit is further used for recursively updating the factorization matrix D by way of updating one row at a time.

31. The receiver according to claim 30, wherein the processing unit is further used for changing one row vector of the factorization matrix D as the sum of a linear combination of other row vectors and the row vector.

32. The receiver according to claim 29, wherein the processing unit is further used for changing one row vector of the factorization matrix D as the sum of a linear combination of other row vectors and the abovementioned one row vector.

33. The receiver according to claim 29, wherein the detection matrix G is expressed as:

$$G = D\left(H^H H + \frac{\sigma_n^2}{\sigma_x^2} I_{n_t}\right)^{-1} H^H,$$

wherein $\sigma_n^2$ is the variance of a noise vector n, $\sigma_x^2$ is the variance of the transmitting signal vector x, and $I_{n_t}$ is an $n_t \times n_t$ unit matrix.

34. The receiver according to claim 24, wherein the matrix R is factorized as $R=\tilde{R}T$ according to the Lenstra-Lenstra-Lovász (LLL) method, and a solution of the factorization matrix D is obtained according to $D=(T^{-1})^H=[R^{-1}\tilde{R}]^H$.

* * * * *